United States Patent
Fukutome et al.

(10) Patent No.: US 12,240,955 B2
(45) Date of Patent: Mar. 4, 2025

(54) METHOD FOR PRODUCING COMPOSITION FOR MELT PROCESSING

(71) Applicant: KANEKA CORPORATION, Osaka (JP)

(72) Inventors: Asuka Fukutome, Settsu (JP); Tetsuo Okura, Settsu (JP); Shunsuke Sato, Takasago (JP)

(73) Assignee: KANEKA CORPORATION, Osaka (JP)

( * ) Notice: Subject to any disclaimer, the term of this patent is extended or adjusted under 35 U.S.C. 154(b) by 616 days.

(21) Appl. No.: 17/627,356

(22) PCT Filed: Jul. 10, 2020

(86) PCT No.: PCT/JP2020/027044
§ 371 (c)(1),
(2) Date: Jan. 14, 2022

(87) PCT Pub. No.: WO2021/010327
PCT Pub. Date: Jan. 21, 2021

(65) Prior Publication Data
US 2022/0267547 A1    Aug. 25, 2022

(30) Foreign Application Priority Data
Jul. 16, 2019   (JP) .................................. 2019-131278

(51) Int. Cl.
*C08G 63/06* (2006.01)
*B29B 11/10* (2006.01)
*B29C 71/02* (2006.01)
*B29K 96/00* (2006.01)

(52) U.S. Cl.
CPC ................. *C08J 7/08* (2013.01); *B29B 11/10* (2013.01); *C08G 63/06* (2013.01); *B29K 2096/00* (2013.01); *C08G 2250/00* (2013.01); *C08J 2367/04* (2013.01)

(58) Field of Classification Search
CPC .......... C08L 67/04; C08G 63/88; C08G 63/06
See application file for complete search history.

(56) References Cited

U.S. PATENT DOCUMENTS

| | | | |
|---|---|---|---|
| 5,693,389 A | 12/1997 | Liggat | |
| 2009/0197982 A1* | 8/2009 | Miyagawa | .......... B29C 44/3461 521/60 |
| 2017/0198136 A1 | 7/2017 | Minami et al. | |

FOREIGN PATENT DOCUMENTS

| | | | |
|---|---|---|---|
| JP | 8-510498 A | | 11/1996 |
| JP | 2009096849 A | * | 5/2009 |
| WO | WO 2015/146194 A1 | | 10/2015 |

OTHER PUBLICATIONS

International Search Report mailed on Sep. 15, 2020 in PCT/JP2020/027044 filed on Jul. 10, 2020 (3 pages).
Kershaw, P.J., "Biodegradable Plastics and Marine Litter. Misconceptions, concerns and impacts on marine environments", United Nations Environment Programme (UNEP), 2015, 38 total pages.

* cited by examiner

*Primary Examiner* — Gregory Listvoyb
(74) *Attorney, Agent, or Firm* — Oblon, McClelland, Maier & Neustadt, L.L.P.

(57) ABSTRACT

A method for producing a poly(3-hydroxybutyrate) resin-containing composition for melt processing includes: heating a material containing a poly(3-hydroxybutyrate) resin to a temperature equal to or higher than a melting point peak temperature in differential scanning calorimetry analysis of the poly(3-hydroxybutyrate) resin and equal to or lower than a melting point peak end temperature in the differential scanning calorimetry analysis of the poly(3-hydroxybutyrate) resin, wherein the difference between the melting point peak temperature and the melting point peak end temperature of the poly(3-hydroxybutyrate) resin is 10° C. or more; and extruding the heated material to obtain a composition for melt processing that has a new crystallization peak at a temperature higher than the melting point peak temperature.

16 Claims, 1 Drawing Sheet

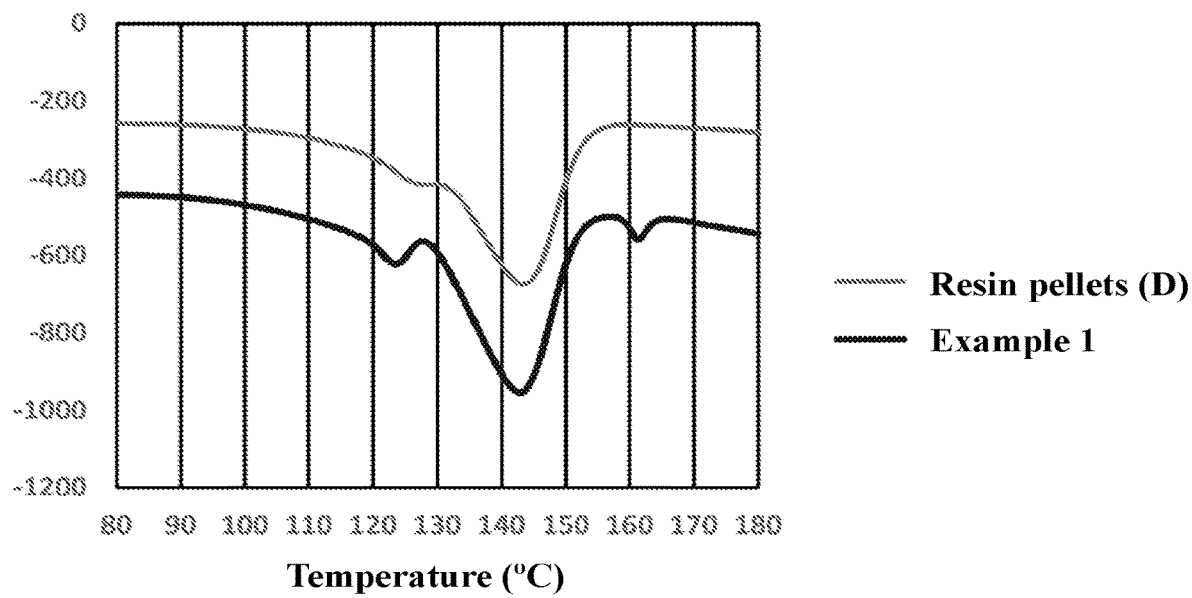

METHOD FOR PRODUCING COMPOSITION FOR MELT PROCESSING

TECHNICAL FIELD

The present invention relates to a method for producing a poly(3-hydroxybutyrate) resin-containing composition for melt processing and a method for producing a molded body using the composition for melt processing.

BACKGROUND ART

In recent years, separate collection and composting of raw garbage have been promoted especially in Europe, and plastic products that can be composted together with raw garbage have been desired.

In the meantime, environmental problems caused by waste plastics have become an issue of great concern. In particular, it has been found that a huge amount of plastics dumped at seas or carried into seas through rivers are drifting in all oceans on the Earth. Such plastics, which retain their shapes for a long period of time, are pointed out as having various harmful effects on the ecosystems, and examples of plastics-induced problems include: a phenomenon called ghost fishing where plastics catch or trap marine creatures; and eating disorder that marine creatures having ingested plastics suffer due to the plastics remaining in their digestive organs.

There is also known a problematic phenomenon where plastics are broken into microplastic particles by the action of ultraviolet rays or any other cause, then the microplastic particles adsorb hazardous substances present in seawater, and marine creatures ingest the microplastic particles with the adsorbed hazardous substances, so that the hazardous substances are introduced into the food chain.

The use of biodegradable plastics is expected as means for addressing the plastics-induced marine pollution as described above. However, a report issued by the United Nations Environment Programme in 2015 (Non Patent Literature 1) states that plastics such as polylactic acid that can be biodegraded through compositing are not expected to be degraded quickly in the actual oceans whose temperatures are low and cannot therefore be used as a countermeasure against the marine pollution.

Under these circumstances, poly(3-hydroxybutyrate) resins, which can be biodegraded even in seawater, are attracting attention as a promising solution to the above problems.

However, poly(3-hydroxybutyrate) resins have a low crystallization speed, because of which molding of a poly(3-hydroxybutyrate) resin requires a long cooling time for solidification following heating and melting of the resin. This leads to low productivity.

To address this problem, attempts to improve the solidification characteristics of a poly(3-hydroxybutyrate) resin have been made by adding a crystal nucleating agent to the poly(3-hydroxybutyrate) resin.

For example, Patent Literature 1 states that when a first polyhydroxyalkanoate (PHA-X) is blended with a second polyhydroxyalkanoate (PHA-Y or high-melting PHA) whose crystalline melting point has been increased by at least 3° C. through annealing, the high-melting PHA acts as a crystal nucleating agent for the PHA-X. Patent Literature 1 describes the annealing as the step of heating the PHA-Y at a temperature 1 to 10° C. below the crystalline melting point for 10 minutes to 12 hours, and states that mixing the high-melting PHA obtained by the annealing with the PHA-X leads to production of a PHA composition with an increased crystallization speed.

Patent Literature 2 describes a composition containing a first PHA and a second PHA and obtainable by causing a single species of microorganism to produce both the first and second PHAs, and states that this composition solidifies quickly during molding.

CITATION LIST

Patent Literature

PTL 1: Japanese Laid-Open Patent Application Publication (Translation of PCT Application) No. H8-510498
PTL 2: WO 2015/146194

Non Patent Literature

NPL 1: BIODEGRADABLE PLASTICS & MARINE LITTER, United Nations Environment Programme 2015

SUMMARY OF INVENTION

Technical Problem

In the method described in Patent Literature 1, in order to obtain the PHA composition with an increased crystallization speed, the high-melting PHA is first obtained by annealing that requires 10 minutes or more, then the high-melting PHA is made into powder by crushing or any other process, and subsequently the powdered high-melting PHA is mixed with the PHA-X. The need for such complicated steps leads to significantly low productivity in production of a composition for melt processing such as a composition in the form of pellets. Additionally, in case that the high-melting PHA cannot be made into powder having a sufficiently small particle size, the effect of the high-melting PHA as a crystal nucleating agent is reduced, or the powdered high-melting PHA could cause appearance defects such as fish eyes when the composition for melt processing is molded into a film or any other product.

With the method described in Patent Literature 2, the crystallization speed of the PHA is somewhat increased. However, the improvement in solidification characteristics could be insufficient due to the absence of any crystal nucleating agent resistant to melting during melt processing of the PHA composition.

In view of the above circumstances, the present invention aims to provide a method for producing a poly(3-hydroxybutyrate) resin-containing composition for melt processing that has excellent solidification characteristics in a simple way and a method for producing a molded body using the composition for melt processing.

Solution to Problem

As a result of intensive studies with the goal of solving the above problems, the present inventors have found that a composition for melt processing that has excellent solidification characteristics can be produced in a simple way by extruding a poly(3-hydroxybutyrate) resin having a particular melting behavior under particular temperature conditions so that the resulting composition has a new crystallization peak at a temperature higher than a peak temperature of a melting point peak that is present before the extrusion. Based on this finding, the inventors have completed the present invention.

Specifically, the present invention relates to a method for producing a poly(3-hydroxybutyrate) resin-containing composition for melt processing, the method including: heating a material containing a poly(3-hydroxybutyrate) resin to a temperature equal to or higher than a melting point peak temperature in differential scanning calorimetry analysis of the poly(3-hydroxybutyrate) resin and equal to or lower than a melting point peak end temperature in the differential scanning calorimetry analysis of the poly(3-hydroxybutyrate) resin, wherein the difference between the melting point peak temperature and the melting point peak end temperature of the poly(3-hydroxybutyrate) resin is 10° C. or more; and extruding the heated material to obtain a composition for melt processing that has a new crystallization peak at a temperature higher than the melting point peak temperature. Preferably, the poly(3-hydroxybutyrate) resin includes a resin containing poly(3-hydroxybutyrate-co-3-hydroxyhexanoate). Preferably, the temperature of the material during the extrusion is 175° C. or lower. Preferably, a weight-average molecular weight of the poly(3-hydroxybutyrate) resin is $40 \times 10^4$ or less. Preferably, the melting point peak temperature of the poly(3-hydroxybutyrate) resin is 135° C. or higher.

The present invention further relates to a method for producing a poly(3-hydroxybutyrate) resin-containing molded body, the method including: obtaining a composition for melt processing by the method as defined above; and subjecting the composition to melt processing to produce a molded body.

Advantageous Effects of Invention

The present invention can provide a method for producing a poly(3-hydroxybutyrate) resin-containing composition for melt processing that has excellent solidification characteristics in a simple way and a method for producing a molded body using the composition for melt processing.

BRIEF DESCRIPTION OF DRAWINGS

The FIGURE shows differential scanning calorimetry analysis curves obtained by differential scanning calorimetry analysis of resin pellets (D) used as a raw material and pellets obtained in Example 1.

DESCRIPTION OF EMBODIMENTS

Hereinafter, embodiments of the present invention will be described below. The present invention is not limited to the embodiments described below.

[Method for Producing Composition for Melt Processing]

First, a method for producing a composition for melt processing will be specifically described.

The composition for melt processing in the present invention refers to a resin composition for use as a raw material for melt processing such as injection molding, inflation molding, T-die sheet forming, or blow molding. That is, various kinds of molded bodies can be produced by melt processing of the composition for melt processing. The composition is not limited to a particular form, and may be, for example, in the form of pellets or powder.

The poly(3-hydroxybutyrate) resin-containing composition for melt processing in the present invention has not only a melting point peak intrinsic to the poly(3-hydroxybutyrate) resin (this peak is also referred to as "main peak" hereinafter) but also another crystallization peak that appears at a temperature higher than the peak temperature of the main peak (this crystallization peak is also referred to as "sub-peak" hereinafter). The presence of the sub-peak indicates that high-melting resin crystals resistant to melting during subsequent melt processing are contained in the poly(3-hydroxybutyrate) resin.

In general, poly(3-hydroxybutyrate) resins are crystallized and solidified slowly after being melted, and this leads to low productivity in melt processing. In contrast, in the case of melt processing of the poly(3-hydroxybutyrate) resin-containing composition that has the melting behavior as described above, it is easy to melt the composition to such a degree that the composition is melt-processable and at the same time allow some resin crystals to remain unmelted in the composition. The remaining resin crystals act as a crystal nucleating agent for the molten resin, and thus the molten resin can be crystallized and solidified readily. As such, the solidification characteristics of the poly(3-hydroxybutyrate) resin during melt processing can be improved.

In the composition for melt processing as defined in the present invention, the peak temperature of the sub-peak is not limited to a particular value and may be any temperature higher than the melting point peak temperature intrinsic to the poly(3-hydroxybutyrate) resin. In order to easily allow some resin crystals to remain unmelted during melt processing, the peak temperature of the sub-peak is preferably 1 to 60° C. above the melting point peak temperature intrinsic to the poly(3-hydroxybutyrate) resin and more preferably 12 to 50° C. above the intrinsic melting point peak temperature.

The following describes a method for producing the composition for melt processing in the present invention.

In the present invention, the composition for melt processing that has the melting behavior as described above can be produced by heating and extruding a material containing a poly(3-hydroxybutyrate) resin having a particular melting behavior under particular temperature conditions.

The temperature conditions during extrusion are set so that the temperature of the material during extrusion is equal to or higher than a melting point peak temperature in differential scanning calorimetry analysis of the poly(3-hydroxybutyrate) resin contained in the material and equal to or lower than a melting point peak end temperature in the differential scanning calorimetry analysis of the poly(3-hydroxybutyrate) resin. The temperature of the material, as described herein, does not refer to the set temperature of the extruder but to the actual temperature of the material during extrusion, and this actual temperature is inclusive of an increase in temperature induced by shear heating. The actual temperature of the material during extrusion can be measured for the resin discharged from the die of the extruder. The temperature of the material during extrusion can vary depending on factors such as the molecular weight of the resin, the set temperature (cylinder temperature) of the extruder, the screw configuration, and the screw rotational speed. Thus, the temperature of the material during extrusion can be controlled by appropriately adjusting the above factors.

The use of the above temperature conditions during extrusion allows some crystals of the poly(3-hydroxybutyrate) resin to remain during extrusion, thus making it possible to generate a new sub-peak at a temperature higher than the peak temperature of the main peak. The peak temperature of the generated sub-peak can be about 5 to 20° C. above the material temperature during extrusion. If extrusion is attempted under conditions where the material temperature during extrusion is below the melting point peak temperature of the poly(3-hydroxybutyrate) resin, the extrusion could not be carried out owing to insufficient fluidity arising from the small amount of the molten resin. If extrusion is carried out under conditions where the material temperature during extrusion is above the melting point peak end temperature of the poly(3-hydroxybutyrate) resin, resin crystals cannot remain in the molten resin, and consequently the new sub-peak cannot be generated in the resulting composition.

In general, the material temperature during extrusion, which is affected by shear heating caused by the extruder, is difficult to precisely control. Thus, in order to easily achieve the above temperature conditions during extrusion, a poly (3-hydroxybutyrate) resin that exhibits a broad melting point peak in differential scanning calorimetry analysis is used as the raw material in the extrusion. Specifically, the poly(3-hydroxybutyrate) resin used is one for which the difference between the melting point peak temperature and the melting point peak end temperature is 10° C. or more.

The material temperature during extrusion only has to meet the above temperature conditions. As for the specific value of the material temperature during extrusion, the temperature is preferably 175° C. or lower, more preferably 170° C. or lower, even more preferably 165° C. or lower, and particularly preferably 160° C. or lower. The lower limit of the temperature is not limited to a particular value, but the temperature is preferably 140° C. or higher, more preferably 145° C. or higher, and even more preferably 150° C. or higher.

The screw configuration of the extruder is not limited to a particular type, and the screw configuration can be designed as appropriate in consideration of the above temperature conditions. A screw configuration that can reduce shear heating is preferred and, in particular, a full flight screw configuration is preferred.

The processing device used to carry out the extrusion is not limited to a particular type, and a known device such as a Banbury mixer, a roll mill, a kneader, or a single- or multi-screw extruder can be used.

The poly(3-hydroxybutyrate) resin in the present invention is an aliphatic polyester resin producible by microorganisms and containing at least 3-hydroxybutyrate as a repeating unit. The poly(3-hydroxybutyrate) resin may be poly(3-hydroxybutyrate) which contains only 3-hydroxybutyrate as the repeating unit or may be a copolymer of 3-hydroxybutyrate and another hydroxyalkanoate. The poly (3-hydroxybutyrate) resin may be a mixture of a homopolymer and one or more copolymers or a mixture of two or more copolymers.

Specific examples of the poly(3-hydroxybutyrate) resin include poly(3-hydroxybutyrate), poly(3-hydroxybutyrate-co-3-hydroxyhexanoate), poly(3-hydroxybutyrate-co-3-hydroxyvalerate), poly(3-hydroxybutyrate-co-4-hydroxybutyrate), poly(3-hydroxybutyrate-co-3-hydroxyoctanoate), and poly(3-hydroxybutyrate-co-3-hydroxyoctadecanoate). Among these, poly(3-hydroxybutyrate), poly(3-hydroxybutyrate-co-3-hydroxyhexanoate), poly(3-hydroxybutyrate-co-3-hydroxyvalerate), and poly(3-hydroxybutyrate-co-4-hydroxybutyrate) are preferred as they are easy to industrially produce.

Poly(3-hydroxybutyrate-co-hydroxyhexanoate) is more preferred for the following reasons: the ratio between the repeating units can be varied to change the melting point and crystallinity and adjust the physical properties such as the Young's modulus and heat resistance to levels intermediate between those of polypropylene and polyethylene; and this plastic is easy to industrially produce as mentioned above and useful in terms of physical properties. Poly(3-hydroxybutyrate) resins have the property of being thermally decomposed easily under heating at 180° C. or higher and, in particular, poly(3-hydroxybutyrate-co-3-hydroxyhexanoate) has a low melting point and is moldable at low temperature. Poly(3-hydroxybutyrate-co-3-hydroxyhexanoate) is preferred also in this respect.

As for the ratio between the repeating units of poly(3-hydroxybutyrate-co-3-hydroxyhexanoate), the 3-hydroxybutyrate unit/3-hydroxyhexanoate unit ratio is preferably from 80/20 to 99/1 (mol/mol) and more preferably from 75/15 to 97/3 (mol/mol) in terms of the balance between flexibility and strength. This is because the ratio is preferably 99/1 or less in terms of flexibility and because the ratio is preferably 80/20 or more in order for the resin to have a suitable hardness.

An example of commercially-available poly(3-hydroxybutyrate-co-3-hydroxyhexanoate) is "Kaneka Biodegradable Polymer PHBH™" of Kaneka Corporation.

As for poly(3-hydroxybutyrate-co-3-hydroxyvalerate), although its physical properties such as the melting point and Young's modulus can be changed depending on the ratio between the 3-hydroxybutyrate component and the 3-hydroxyvalerate component, the crystallinity of poly(3-hydroxybutyrate-co-3-hydroxyvalerate) is as high as 50% or more because the two components are co-crystallized. Thus, poly(3-hydroxybutyrate-co-3-hydroxyvalerate), albeit being more flexible than poly(3-hydroxybutyrate), cannot offer sufficient improvement in terms of brittleness.

In the present invention, the composition for melt processing is produced using a poly(3-hydroxybutyrate) resin for which the difference between the melting point peak temperature and the melting point peak end temperature in differential scanning calorimetry analysis is 10° C. or more. By using the poly(3-hydroxybutyrate) resin having such a melting behavior and controlling the material temperature during extrusion to a temperature equal to or higher than the melting point peak temperature and equal to or lower than the melting point peak end temperature, it is possible to melt a major portion of the poly(3-hydroxybutyrate) resin and at the same time allow some resin crystals to remain unmelted and further grow. Thus, extrusion and pelletization of the poly(3-hydroxybutyrate) resin and annealing of the resin can be simultaneously accomplished, and a poly(3-hydroxybutyrate) resin-containing composition having excellent solidification characteristics can be produced in a simple way.

The above temperature difference is more preferably 12° C. or more, even more preferably 15° C. or more, still even more preferably 18° C. or more, particularly preferably 20° C. or more, and most preferably 25° C. or more. The upper limit of the temperature difference is not limited to a particular value. In terms of ease of production of the poly(3-hydroxybutyrate) resin, the temperature difference is preferably 50° C. or less. In order to further improve the solidification characteristics, the melting point peak temperature of the poly(3-hydroxybutyrate) resin for which the temperature difference is 10° C. or more is preferably 130° C. or higher and more preferably 135° C. or higher. The upper limit of the melting point peak temperature is not limited to a particular value, but the melting point peak temperature is preferably 160° C. or lower and more preferably 150° C. or lower.

In the present invention, the melting point peak temperature and melting point peak end temperature in differential scanning calorimetry analysis are defined as follows: An aluminum pan is charged with 4 to 10 mg of a resin sample; the resin sample is subjected to differential scanning calorimetry analysis which uses a differential scanning calorimeter and in which the resin sample is melted under a stream of nitrogen by increasing the temperature from 30 to 180° C. at a rate of 10° C./min; and in the endothermic curve obtained by the calorimetry analysis, the temperature at which the amount of absorbed heat reaches a maximum is determined as the melting point peak temperature, and the temperature at which the melting point peak ends and the endothermic process ceases to be observed is determined as the melting point peak end temperature. The melting point peak temperature and melting point peak end temperature are measured for the total poly(3-hydroxybutyrate) resin contained in the material to be extruded.

A poly(3-hydroxybutyrate) resin that exhibits a broad melting point peak and that contains a high-melting component can be used as the poly(3-hydroxybutyrate) resin for which the difference between the melting point peak temperature and the melting point peak end temperature is 10° C. or more. The poly(3-hydroxybutyrate) resin that exhibits a broad melting point peak and that contains a high-melting component and another poly(3-hydroxybutyrate) resin having different melting point properties can be used in combination.

A specific method for producing the poly(3-hydroxybutyrate) resin that exhibits a broad melting point peak and that contains a high-melting component is described, for example, in Patent Literature 2 (WO 2015/146194). In the described method, at least two kinds of poly(3-hydroxybutyrate) resins differing in melting point behavior are produced together in a single species of microorganism to obtain a resin mixture.

The weight-average molecular weight of the poly(3-hydroxybutyrate) resin is not limited to a particular range, but is preferably low in order to minimize shear heating during extrusion. To be specific, the weight-average molecular weight is preferably $40 \times 10^4$ or less and more preferably $30 \times 10^4$ or less. The lower limit of the weight-average molecular weight is not limited to a particular value, but the weight-average molecular weight is preferably $10 \times 10^4$ or more and more preferably $15 \times 10^4$ or more in terms of the mechanical strength of the molded body.

The weight-average molecular weight of the poly(3-hydroxybutyrate) resin can be measured as a polystyrene-equivalent molecular weight by gel permeation chromatography using a chloroform solution of the poly(3-hydroxybutyrate) resin. The columns used in the gel permeation chromatography may be any columns suitable for weight-average molecular weight measurement.

The material to be extruded or the produced composition for melt processing may contain an additional resin in addition to the poly(3-hydroxybutyrate) resin to the extent that the additional resin does not impair the effect of the present invention. Examples of the additional resin include: aliphatic polyester resins such as polybutylene succinate adipate, polybutylene succinate, polybutylene carbonate, polycaprolactone, and polylactic acid; and aliphatic-aromatic polyester resins such as polybutylene adipate terephthalate, polybutylene sebacate terephthalate, and polybutylene azelate terephthalate. One additional resin may be contained, or two or more additional resins may be contained.

The content of the additional resin is not limited to a particular range, but is preferably 40 parts by weight or less and more preferably 30 parts by weight or less per 100 parts by weight of the poly(3-hydroxybutyrate) resin. The lower limit of the content of the additional resin is not limited to a particular value, and the content may be 0 part by weight.

The material to be extruded or the produced composition for melt processing need not contain any inorganic filler, but may contain an inorganic filler in order to increase the strength of the molded body.

The inorganic filler is not limited to a particular type, and may be any inorganic filler that can be added to the composition for melt processing. Examples of the inorganic filler include: silica-based inorganic fillers such as quartz, fumed silica, silicic anhydride, molten silica, crystalline silica, amorphous silica, a filler obtained by condensation of alkoxysilane, and ultrafine amorphous silica; and other inorganic fillers such as alumina, zircon, iron oxide, zinc oxide, titanium oxide, silicon nitride, boron nitride, aluminum nitride, silicon carbide, glass, silicone rubber, silicone resin, titanium oxide, carbon fiber, mica, black lead, carbon black, ferrite, graphite, diatomite, white clay, clay, talc, calcium carbonate, manganese carbonate, magnesium carbonate, barium sulfate, and silver powder, One of these fillers may be used alone, or two ore more thereof may be used in combination.

The inorganic filler may be surface-treated in order to increase the dispersibility in the composition for melt processing. Examples of the treatment agent used for the surface treatment include higher fatty acids, silane coupling agents, titanate coupling agents, sol-gel coating agents, and resin coating agents.

The water content of the inorganic filler is preferably from 0.01 to 10%, more preferably from 0.01 to 5%, and even more preferably from 0.01 to 1% in order to reliably inhibit hydrolysis of the poly(3-hydroxybutyrate) resin. The water content can be determined according to JIS K 5101.

The average particle size of the inorganic filler is preferably from 0.1 to 100 m and more preferably from 0.1 to 50 μm in order to ensure good properties and high processability of the molding material. The average particle size can be measured using a laser diffraction/scattering particle size analyzer such as "Microtrac MT3100II" of Nikkiso Co., Ltd.

Among inorganic fillers, those belonging to silicates are preferred since such fillers can provide an increase in heat resistance and improvement in processability. Among silicates, at least one selected from the group consisting of talc, mica, kaolinite, montmorillonite, and smectite is preferred since these silicates provide a significant increase in the mechanical strength of the molded body obtained by melt processing and have a narrow particle size distribution such that they cause less deterioration in surface smoothness and mold surface transferability. Two or more silicates may be used in combination and, in this case, the types and proportions of the silicates can be adjusted as appropriate.

Examples of the talc include general-purpose talc and surface-treated talc, specific examples of which include "MICRO ACE™" of Nippon Talc Co., Ltd., "Talcan Powder™" of Hayashi Kasei Co., Ltd., and talc of Takehara Kagaku Kogyo Co., Ltd. or Maruo Calcium Co., Ltd.

Examples of the mica include wet-ground mica and dry-ground mica, specific examples of which include mica of Yamaguchi Mica Co., Ltd. or Keiwa Rozai Co., Ltd.

Examples of the kaolinite include dry kaolin, calcined kaolin, and wet kaolin, specific examples of which include "TRANSLINK™", "ASP™", "SANTINTONE™", and "ULTREX™" of Hayashi Kasei Co., Ltd. and kaolinite of Keiwa Rozai Co., Ltd.

The amount of the inorganic filler is preferably from 0 to 40 parts by weight per 100 parts by weight of the poly(3-hydroxybutyrate) resin. The inorganic filler need not be added; however, the addition of the inorganic filler offers the advantage of increasing the strength of the molded body. In the case where the inorganic filler is added, the amount of the inorganic filler is preferably from 5 to 35 parts by weight and more preferably from 10 to 30 parts by weight. If the amount of the inorganic filler is more than 40 parts by weight, the fluidity of the molten resin could be reduced.

The material to be extruded or the produced composition for melt processing need not contain a crystal nucleating agent consisting of pentaerythritol. In the present invention, even when the poly(3-hydroxybutyrate) resin-containing composition for melt processing composition is devoid of any crystal nucleating agent, post-melting crystallization and solidification are accelerated, and a molded body can be produced with high productivity. In the case where the composition for melt processing does not contain any crystal nucleating agent, soiling of the mold due to a crystal nucleating agent adhering to the mold surface can be avoided.

The material to be extruded or the produced composition for melt processing may contain an additive usable with the poly(3-hydroxybutyrate) resin to the extent that the additive does not impair the effect of the present invention. Examples of the additive include: colorants such as pigments and dyes; odor absorbers such as activated carbon and zeolite; flavors such as vanillin and dextrin; plasticizers; oxidation inhibitors; antioxidants; weather resistance improvers; ultraviolet absorbers; lubricants; mold releases; water repellents; antimicrobials; and slidability improvers. Only one additive may be contained or two or more additives may be contained. The contents of these additives can be chosen by those skilled in the art as appropriate depending on the intended purpose.

[Method for Producing Molded Body]

Next, a method for producing a molded body using the composition for melt processing will be specifically described.

The composition for melt processing (e.g., pellets) produced by the present invention is thoroughly dried at about 40 to 80° C. as necessary to remove water, then any additional resin or additive is blended into the composition as necessary, and the composition is subjected to a known molding method. In this manner, any shape of molded body can be produced using the composition. Examples of the molding method include film forming, sheet forming, injection molding, blow molding, fiber spinning, extrusion foaming, and bead foaming.

The method for producing a film-shaped body is not limited to a particular technique, and examples of the method include T-die extrusion, calender forming, roll forming, and inflation molding. The forming temperature during film forming is preferably from 140 to 190° C. and more preferably from 140 to 170° C. The film-shaped body obtained can be further subjected to a process such as heating-based thermoforming, vacuum forming, or press forming.

Examples of the method which can be used to produce an injection-molded body include injection molding methods commonly used for molding of thermoplastic resins and other injection molding methods such as gas-assisted injection molding and injection compression molding. A method other than the above methods may be used depending on the intended purpose. For example, in-mold injection molding, gas counter pressure molding, double molding, sandwich molding, push-pull injection molding, or SCORIM can be used. Injection molding methods usable in the present invention are not limited to those mentioned above. The molding temperature during injection molding is preferably from 140 to 190° C., and the mold temperature is preferably from 20 to 80° C. and more preferably from 30 to 70° C.

The molded body obtained by the present invention can be suitably used in various fields such as agricultural industry, fishery industry, forestry industry, horticultural industry, medical industry, hygiene industry, apparel industry, non-apparel industry, packaging industry, automotive industry, building material industry, and various other industries. The use of the molded body is not limited to particular products, and exemplary products include tableware, materials for agriculture, parts of OA equipment, parts of home electric appliances, parts of automobiles, daily sundries, stationery products, bottle-shaped articles, extruded sheets, and profile extrusion products. Additionally, the composition for melt processing or molded body obtained by the present invention is degradable in seawater because the resin component consists primarily of a poly(3-hydroxybutyrate) resin. Thus, the composition or molded body can be a solution to environmental problems caused by dumping of plastics at sea.

EXAMPLES

Hereinafter, the present invention will be described specifically using examples. The technical scope of the present invention is not limited by the examples given below.

(Production Example of Raw Material Powder (A))

Poly(3-hydroxybutyrate-co-3-hydroxyhexanoate) was produced by a culture production method as described in WO 2015-052876 using KNK-005 strain (see U.S. Pat. No. 7,384,766). After the culturing, the poly(3-hydroxybutyrate-co-3-hydroxyhexanoate) was collected from the culture fluid by a method as described in WO 2010/067543. The molecular weight was adjusted by hydrolysis. The weight-average molecular weight was measured to be $57 \times 10^4$.

(Production Example of Raw Material Powders (B) and (C))

Poly(3-hydroxybutyrate-co-3-hydroxyhexanoate) was produced by a culture production method identical to that described in Example 1 of WO 2015/146195 except for the use of PKO (palm kernel oil) as the carbon source. The strain used was KNK-005 ΔphaZ1:Plac-phaCRe ΔphaZ2,6 described in Example 11 of WO 2015/146195. Subsequently, the poly(3-hydroxybutyrate-co-3-hydroxyhexanoate) was collected in the same manner as in "Production example of raw material powder (A)". The molecular weight was adjusted by hydrolysis. A powder having a weight-average molecular weight of $27 \times 10^4$ was used as "raw material powder (B)", and a powder having a weight-average molecular weight of $71 \times 10^4$ was used as "raw material powder (C)".

(Production Example of Raw Material Powder (E))

Poly(3-hydroxybutyrate-co-3-hydroxyhexanoate) was produced by a method as described in Example 3 of Patent Literature 2. Subsequently, the poly(3-hydroxybutyrate-co-3-hydroxyhexanoate) was collected in the same manner as in "Production example of raw material powder (A)". The molecular weight was adjusted by hydrolysis. The weight-average molecular weight was measured to be $20 \times 10^4$.

(Resin Raw Materials Used)

Raw material powder (A): Poly(3-hydroxybutyrate-co-3-hydroxyhexanoate) for which the difference between the melting point peak temperature and the melting point peak end temperature in differential scanning calorimetry analysis is less than 10° C., in particular 7° C. (3-hydroxyhexanoate content=5.8 mol/%, weight-average molecular weight=$57 \times 10^4$)

Raw material powder (B): Poly(3-hydroxybutyrate-co-3-hydroxyhexanoate) for which the difference between the melting point peak temperature and the melting point peak end temperature in differential scanning calorimetry analysis is 10° C. or more, in particular 34° C. (3-hydroxyhexanoate content=6.8 mol/%, weight-average molecular weight=27×10$^4$)

Raw material powder (C): Poly(3-hydroxybutyrate-co-3-hydroxyhexanoate) for which the difference between the melting point peak temperature and the melting point peak end temperature in differential scanning calorimetry analysis is 10° C. or more, in particular 39° C. (3-hydroxyhexanoate content=6.8 mol/%, weight-average molecular weight=71×10$^4$)

Resin pellets (D): Poly(3-hydroxybutyrate-co-3-hydroxyhexanoate) for which the difference between the melting point peak temperature and the melting point peak end temperature in differential scanning calorimetry analysis is 10° C. or more, in particular 14° C. (3-hydroxyhexanoate content=5.6 mol/%, weight-average molecular weight=56×10$^4$)

Raw material powder (E): Poly(3-hydroxybutyrate-co-3-hydroxyhexanoate) for which the difference between the melting point peak temperature and the melting point peak end temperature in differential scanning calorimetry analysis is 10° C. or more, in particular 49° C. (3-hydroxyhexanoate content=10.5 mol/%, weight-average molecular weight=20×10$^4$)

Resin pellets (F): Poly(3-hydroxybutyrate-co-3-hydroxyhexanoate) for which the difference between the melting point peak temperature and the melting point peak end temperature in differential scanning calorimetry analysis is less than 10° C., in particular 7° C. (3-hydroxyhexanoate content=5.8 mol/%, weight-average molecular weight=40×10$^4$)

(Method for Measurement of Weight-Average Molecular Weight)

The weight-average molecular weight of each poly(3-hydroxybutyrate) resin was measured as follows. First, the poly(3-hydroxybutyrate) resin was dissolved in chloroform, and the solution was heated in a hot water bath at 60° C. for 0.5 hours and then filtered through a disposable filter made of PTFE and having a pore size of 0.45 μm. Subsequently, GPC analysis was conducted using the filtrate under the conditions listed below, and thus the weight-average molecular weight was determined.

GPC system: RI monitor (L-3000) manufactured by Hitachi

Columns: K-G (one column) and K-806 L (two columns) manufactured by Showa Denko K.K.

Sample concentration: 3 mg/ml
Eluent: Chloroform solution
Eluent flow rate: 1.0 ml/min
Sample injection rate: 100 μL
Analysis time: 30 minutes
Standard sample: Standard polystyrene (Preparation of Resin Pellets (D))

95 parts by weight of the raw material powder (A) was dry-blended with 5 parts by weight of poly(3-hydroxybutyrate-co-3-hydroxyvalerate) manufactured by Biomer, and the blend was melted and kneaded using TEM 26SS, a twin-screw extruder manufactured by Toshiba Machine Co., Ltd. at a cylinder set temperature of 150° C. and a screw rotational speed of 100 rpm. Thus, the resin pellets (D) were prepared.

(Evaluation by Differential Scanning Calorimetry Analysis)

An aluminum pan was charged with 4 to 10 mg of a resin sample, and the resin sample was subjected to differential scanning calorimetry analysis which used a differential scanning calorimeter and in which the resin sample was melted under a stream of nitrogen by increasing the temperature from 30 to 180° C. at a rate of 10° C./min. In the endothermic curve obtained by the calorimetry analysis, the temperature at which the amount of absorbed heat reached a maximum was determined as the melting point peak temperature, and the temperature at which the melting point peak ended and the endothermic process ceased to be observed was determined as the melting point peak end temperature. The melting point peak temperature and melting point peak end temperature were measured for all of the resin raw materials and the pellets produced (compositions for melt processing).

[Production of Composition for Melt Processing]
(Extruder and Screw Configuration)

Extrusion and pelletization in Examples and Comparative Examples were performed using TEM 26SS, a twin extruder manufactured by Toshiba Machine Co., Ltd. The screw configuration employed was any one of S1 to S3 listed below.

S1: Full flight screw
S2: Screw made up of flights and two kneading parts
S3: Screw made up of flights and three kneading parts (Method for Measurement of Resin Outlet Temperature)

The temperature of the resin discharged from the die of the extruder was measured by a contact thermometer.

Example 1

The resin pellets (D) were extruded under extrusion conditions listed in Table 1, and pellets were obtained as a composition for melt processing. As for the extrusion conditions, the cylinder temperature, screw configuration, and screw rotational speed of the extruder were set as shown in Table 1, and the resin temperature during extrusion (resin outlet temperature) was controlled to a temperature (153° C.) between the melting point peak temperature (144° C.) and melting point peak end temperature (158° C.) of the resin pellets (D).

The pellets obtained were subjected to evaluation by differential scanning calorimetry analysis, and it was found that a new melting point peak (sub-peak) was generated at a temperature higher than the melting point peak temperature of the resin pellets (D). The peak temperature of the sub-peak was 161° C. and higher than the melting point peak temperature (144° C.) of the resin pellets (D). The differential scanning calorimetry analysis curves obtained by differential scanning calorimetry analysis of the resin pellets (D) and the pellets of Example 1 are shown in the FIGURE.

Comparative Example 1

Pellets were obtained as a composition for melt processing in the same manner as in Example 1, except that the extrusion conditions were changed as shown in Table 1 and that the resin temperature during extrusion (resin outlet temperature) was 171° C. and not between the melting point peak temperature and melting point peak end temperature of the resin pellets (D). The pellets obtained were subjected to evaluation by differential scanning calorimetry analysis, and it was found that any sub-peak as observed in Example 1 was not generated.

Comparative Example 2

Pellets were obtained as a composition for melt processing in the same manner as in Comparative Example 1, except that the raw material used was the raw material powder (A) for which the difference between the melting point peak temperature and melting point peak end temperature was less than 10° C. The pellets obtained were subjected to evaluation by differential scanning calorimetry analysis, and it was found that any sub-peak as observed in Example 1 was not generated.

Examples 2 and 3

The raw material powder (B) was extruded under extrusion conditions listed in Table 1, and pellets were obtained as a composition for melt processing. As for the extrusion conditions, the cylinder temperature, screw configuration, and screw rotational speed of the extruder were set as shown in Table 1, and the resin temperature during extrusion (resin outlet temperature) was controlled to a temperature (157° C.) between the melting point peak temperature (135° C.) and melting point peak end temperature (169° C.) of the raw material powder (B). In Examples 2 and 3, the screw configurations including kneading parts prone to cause shear heating were employed.

The pellets obtained were subjected to evaluation by differential scanning calorimetry analysis, and it was found that a sub-peak was generated at a temperature higher than the melting point peak temperature of the raw material powder (B). The peak temperature of the sub-peak was 169° C. and higher than the melting point peak temperature (135° C.) of the raw material powder (B).

Comparative Example 3

Pellets were obtained as a composition for melt processing in the same manner as in Example 2 or 3, except that the extrusion conditions were changed as shown in Table 1 and that the resin temperature during extrusion (resin outlet temperature) was 170° C. and not between the melting point peak temperature and melting point peak end temperature of the raw material powder (B). The pellets obtained were subjected to evaluation by differential scanning calorimetry analysis, and it was found that any sub-peak as observed in Example 2 or 3 was not generated.

Comparative Example 4

Pellets were obtained as a composition for melt processing by performing extrusion under the same extrusion conditions as in Example 3, except that the raw material used was the raw material powder (C) identical in composition to the raw material powder (B) but having a higher molecular weight than the raw material powder (B). In this case, enhanced shear heating attributed to the high-molecular-weight raw material led to the resin temperature during extrusion (resin outlet temperature) being 175° C. and higher than the melting point peak end temperature (174° C.) of the raw material powder (C). The pellets obtained were subjected to evaluation by differential scanning calorimetry analysis, and it was found that any sub-peak as observed in Example 2 or 3 was not generated.

Example 4

The raw material powder (E) was extruded under extrusion conditions listed in Table 1, and pellets were obtained as a composition for melt processing. As for the extrusion conditions, the cylinder temperature, screw configuration, and screw rotational speed of the extruder were set as shown in Table 1, and the resin temperature during extrusion (resin outlet temperature) was controlled to a temperature (158° C.) between the melting point peak temperature (118° C.) and melting point peak end temperature (167° C.) of the raw material powder (E).

The pellets obtained were subjected to evaluation by differential scanning calorimetry analysis, and it was found that a sub-peak was generated at a temperature higher than the melting point peak temperature of the raw material powder (E). The peak temperature of the sub-peak was 166° C. and higher than the melting point peak temperature (118° C.) of the raw material powder (E).

TABLE 1

| Production of composition for melt processing | | Example 1 | Example 2 | Example 3 | Example 4 | Comp. Example 1 | Comp. Example 2 | Comp. Example 3 | Comp. Example 4 |
|---|---|---|---|---|---|---|---|---|---|
| Type of raw material | Raw material powder (A) | | | | | 100 | | | |
| | Raw material powder (B) | | 100 | 100 | | | | 100 | |
| | Raw material powder (C) | | | | | | | | 100 |
| | Resin pellets (D) | 100 | | | | | 100 | | |
| | Raw material powder (E) | | | | 100 | | | | |
| Physical properties of raw material | Molecular weight | 56 × 10$^4$ | 27 × 10$^4$ | 27 × 10$^4$ | 20 × 10$^4$ | 56 × 10$^4$ | 57 × 10$^4$ | 27 × 10$^4$ | 71 × 10$^4$ |
| | HH content [mol %] | 5.6 | 6.8 | 6.8 | 10.5 | 5.6 | 5.8 | 6.8 | 6.8 |
| | Melting point peak temperature [° C.] | 144 | 135 | 135 | 118 | 144 | 141 | 135 | 135 |
| | Melting point peak end temperature [° C.] | 158 | 169 | 169 | 167 | 158 | 148 | 169 | 174 |
| | Difference between melting point peak temperature and melting point peak end temperature [° C.] | 14 | 34 | 34 | 49 | 14 | 7 | 34 | 39 |
| Extrusion conditions | Cylinder temperature [° C.] | 150 | 155 | 150 | 150 | 147 | 147 | 155 | 150 |
| | Screw configuration | S1 | S2 | S3 | S1 | S3 | S3 | S3 | S3 |
| | Rotational speed | 30 | 50 | 100 | 50 | 100 | 100 | 200 | 100 |
| | Resin outlet temperature [° C.] | 153 | 157 | 157 | 158 | 171 | 167 | 170 | 175 |
| Generated sub-peak | Peak temperature [° C.] | 161 | 169 | 169 | 166 | NA | NA | NA | NA |
| | Peak end temperature [° C.] | 165 | 173 | 172 | 174 | NA | NA | NA | NA |

[Production of Injection-Molded Body]

(Method for Evaluation of Injection Molding)

TOYO Si-30V (clamping force: 30 tons) was used as the injection molding machine, and the mold used was a single-cavity mold for producing a small spoon with a length of 100 mm (side gate width 1 mm×thickness 1 mm).

(Method for Calculation of Injection Rate)

The injection capacity (cc) from the metering position to the injection-to-holding switching position during injection molding was divided by the injection time [sec] excluding the pressure holding time, and the resulting value was adopted as the injection rate.

(Method for Measurement of Molding Resin Temperature)

Purging (the step of retracting the nozzle from the mold and ejecting the molten resin) was performed after 30 shots of the raw material were molded successively under given injection molding conditions for evaluation, and the resin was then shaped into a sphere, the internal temperature of which was measured by a contact thermometer.

(Evaluation of Solidification Characteristics)

Injection molding was carried out in which the time of cooling in the mold was from 5 to 40 seconds, and the cooling time required for completion of solidification of the resin in the runner was determined.

Example 5

The pellets obtained in Example 2 were melted at a barrel temperature of 160° C., and the molten resin was injection-molded. In this molding, the mold temperature was set to 45° C., and the cooling time for solidification of the molten resin was varied from 5 to 40 seconds in increments of 5 seconds. After the cooling, the mold was opened to release the molded body from the mold, and the shortest cooling time required for completion of solidification was determined. The result is shown in Table 2.

Example 6

Injection molding was carried out in the same manner as in Example 5, except that the pellets obtained in Example 4 were used, and the shortest cooling time required for completion of solidification was determined. The result is shown in Table 2.

Comparative Example 5

Injection molding was carried out in the same manner as in Example 5, except that the resin pellets (F) were used, and the shortest cooling time required for completion of solidification was determined. The result is shown in Table 2.

TABLE 2

| Production of injection-molded body | | Example 5 | Example 6 | Comp. Example 5 |
|---|---|---|---|---|
| Type of composition for melt processing | Resin pellets (F) | | | 100 |
| | Pellets obtained in Example 2 | 100 | | |
| | Pellets obtained in Example 4 | | 100 | |
| Properties of composition for melt processing | HH content [mol %] | 6.8 | 10.5 | 5.8 |
| | Melting point peak temperature [° C.] | 140 | 122 | 143 |
| | Melting point peak end temperature [° C.] | 173 | 174 | 150 |
| | Difference between melting point peak temperature and melting point peak end temperature [° C.] | 33 | 52 | 7 |
| Injection molding conditions | Injection rate [cc/sec] | 1.3 | 1.3 | 1.3 |
| | Mold temperature [° C.] | 45 | 45 | 45 |
| | Molding resin temperature [° C.] | 163 | 163 | 167 |
| Cooling time required for completion of solidification (s) | | 5 | 20 | 40 |

Table 2 reveals that in the case of the pellets (composition for melt processing) of Example 2 or 4 which had a sub-peak, solidification was completed in a shorter cooling time than in the case of the resin pellets (F) devoid of any sub-peak. This leads to the conclusion that the pellets of Example 2 or 4 are superior in the solidification characteristics during melt processing.

The invention claimed is:

1. A method for producing a composition for melt processing, the method comprising:
   heating a material comprising a poly(3-hydroxybutyrate) resin to a temperature equal to or higher than a melting point peak temperature in differential scanning calorimetry analysis of the poly(3-hydroxybutyrate) resin and equal to or lower than a melting point peak end temperature in the differential scanning calorimetry analysis of the poly(3-hydroxybutyrate) resin, wherein a difference between the melting point peak temperature and the melting point peak end temperature of the poly(3-hydroxybutyrate) resin is at least 10° C.; and
   extruding the heated material to obtain a composition for melt processing that has a crystallization peak at a temperature higher than the melting point peak temperature of the poly(3-hydroxybutyrate) resin,
   wherein the crystallization peak of the composition obtained in the extruding is from 1° C. to 60° C. above the melting point peak temperature of the poly(3-hydroxybutyrate) resin.

2. The method according to claim 1, wherein the poly(3-hydroxybutyrate) resin comprises poly(3-hydroxybutyrate-co-3-hydroxyhexanoate).

3. The method according to claim 1, wherein a temperature of the material during the extruding is 175° C. or lower.

4. The method according to claim 1, wherein a weight-average molecular weight of the poly(3-hydroxybutyrate) resin is $40 \times 10^4$ or less.

5. The method according to claim 1, wherein the melting point peak temperature of the poly(3-hydroxybutyrate) resin is at least 135° C.

6. A method for producing a poly(3-hydroxybutyrate) resin-containing molded body, the method comprising:
   obtaining a composition for melt processing by the method according to claim 1; and
   subjecting the composition to melt processing to produce a molded body.

7. The method according to claim 2, wherein a temperature of the material during the extruding is 175° C. or lower.

8. The method according to claim 1, wherein prior to the heating and the extruding, the material does not have the crystallization peak at the temperature higher than the melting point peak temperature of the poly(3-hydroxybutyrate) resin.

9. The method according to claim 1, wherein the difference between the melting point peak temperature and the melting point peak end temperature of the poly(3-hydroxybutyrate) resin is from 12° C. to 50° C.

10. The method according to claim 1, wherein the difference between the melting point peak temperature and the melting point peak end temperature of the poly(3-hydroxybutyrate) resin is from 18° C. to 50° C.

11. The method according to claim 1, wherein the difference between the melting point peak temperature and the melting point peak end temperature of the poly(3-hydroxybutyrate) resin is from 25° C. to 50° C.

12. The method according to claim 1, wherein the melting point peak temperature of the poly(3-hydroxybutyrate) resin is from 135° C. to 160° C.

13. The method according to claim 1, wherein a weight-average molecular weight of the poly(3-hydroxybutyrate) resin is from $15 \times 10^4$ to $30 \times 10^4$ or less.

14. The method according to claim 1, wherein the crystallization peak of the composition obtained in the extruding is from 12° C. to 50° C. above the melting point peak temperature of the poly(3-hydroxybutyrate) resin.

15. The method according to claim 1, wherein a temperature of the material during the extruding is from 140° C. to 165° C.

16. The method according to claim 1, wherein a temperature of the material during the extruding is from 150° C. to 160° C.

* * * * *